(12) United States Patent
Tang

(10) Patent No.: US 11,071,040 B2
(45) Date of Patent: Jul. 20, 2021

(54) D2D COMMUNICATION METHOD AND D2D DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/093,004

(22) PCT Filed: Jun. 29, 2016

(86) PCT No.: PCT/CN2016/087745
§ 371 (c)(1),
(2) Date: Oct. 11, 2018

(87) PCT Pub. No.: WO2018/000262
PCT Pub. Date: Jan. 4, 2018

(65) Prior Publication Data
US 2019/0124583 A1    Apr. 25, 2019

(51) Int. Cl.
*H04W 4/02* (2018.01)
*H04W 4/40* (2018.01)
(Continued)

(52) U.S. Cl.
CPC .......... *H04W 40/246* (2013.01); *H04W 4/02* (2013.01); *H04W 4/023* (2013.01); *H04W 4/20* (2013.01);
(Continued)

(58) Field of Classification Search
CPC ......... H04W 4/02; H04W 4/023; H04W 4/20; H04W 4/40; H04W 28/0226;
(Continued)

(56) References Cited

U.S. PATENT DOCUMENTS 7,139,820 B1 * 11/2006 O'Toole, Jr. .......... H04L 63/123
709/223
8,059,012 B2 * 11/2011 Bai .......................... H04L 45/46
340/902
(Continued)

FOREIGN PATENT DOCUMENTS

CN    1523819 A    8/2004
CN    1750504 A    3/2006
(Continued)

OTHER PUBLICATIONS

Written Opinion of the International Search Authority in international application No. PCT/CN2016/087745, dated Mar. 1, 2017, with English translation provided by WIPO.
(Continued)

*Primary Examiner* — Alpus Hsu
(74) *Attorney, Agent, or Firm* — Ladas & Parry, LLP

(57) ABSTRACT

Embodiments of the present invention provide a D2D communication method and a D2D device. The method comprises: a first terminal device determines information to be forwarded, the information to be forwarded comprising target information and forwarding condition information; and the first terminal device sends the information to be forwarded, such that when receiving the information to be forwarded, a second terminal device determines, according to the forwarding condition information, whether to forward the information to be forwarded. In this way, congestion caused by a large amount of information forwarding is avoided by filtering terminal devices available for information forwarding and enabling a terminal device meeting particular conditions to forward information to be forwarded, thereby avoiding congestion caused by forwarding of a large amount of information.

13 Claims, 9 Drawing Sheets

(51) Int. Cl.
  *H04W 28/02* (2009.01)
  *H04W 40/24* (2009.01)
  *H04W 76/14* (2018.01)
  *H04W 88/04* (2009.01)
  *H04W 84/18* (2009.01)
  *H04W 4/20* (2018.01)
  *H04W 40/20* (2009.01)

(52) U.S. Cl.
  CPC ......... *H04W 4/40* (2018.02); *H04W 28/0226* (2013.01); *H04W 40/20* (2013.01); *H04W 76/14* (2018.02); *H04W 84/18* (2013.01); *H04W 88/04* (2013.01)

(58) Field of Classification Search
  CPC ... H04W 40/20; H04W 40/246; H04W 76/14; H04W 84/18; H04W 88/04
  See application file for complete search history.

(56) References Cited

U.S. PATENT DOCUMENTS

| | | | |
|---|---|---|---|
| 8,314,718 B2* | 11/2012 | Muthaiah | H04L 47/10 340/903 |
| 8,923,147 B2* | 12/2014 | Krishnaswamy | H04L 67/12 370/252 |
| 9,143,912 B2* | 9/2015 | Leppanen | H04W 76/11 |
| 9,495,870 B2* | 11/2016 | Jana | H04W 4/023 |
| 9,832,706 B2* | 11/2017 | Miranda d'Orey | H04W 4/046 |
| 9,935,875 B2* | 4/2018 | Grotendorst | G08G 1/093 |
| 10,038,991 B2* | 7/2018 | Luo | H04W 4/70 |
| 2004/0198386 A1* | 10/2004 | Dupray | H04W 64/00 455/456.1 |
| 2013/0099941 A1 | 4/2013 | Jana | |
| 2013/0288692 A1* | 10/2013 | Dupray | H04W 76/50 455/450 |
| 2014/0177634 A1* | 6/2014 | Jiang | H04L 45/64 370/392 |
| 2015/0156806 A1 | 6/2015 | Pan | |
| 2015/0312953 A1* | 10/2015 | Wang | H04L 1/00 370/312 |
| 2016/0197825 A1 | 7/2016 | Grotendorst et al. | |
| 2017/0019833 A1* | 1/2017 | Luo | H04W 40/24 |
| 2017/0061790 A1 | 3/2017 | Jana et al. | |
| 2017/0215123 A1 | 7/2017 | Miranda d'Orey et al. | |
| 2018/0054773 A1 | 2/2018 | Miranda d'Orey et al. | |

FOREIGN PATENT DOCUMENTS

| | | |
|---|---|---|
| CN | 101652964 A | 2/2010 |
| CN | 102883281 A | 1/2013 |
| CN | 104135438 A | 11/2014 |
| CN | 105474286 A | 4/2016 |
| EP | 1791300 A1 | 5/2007 |
| EP | 2127263 A1 | 12/2009 |
| JP | 2009033442 A | 2/2009 |
| JP | 2010518663 A | 5/2010 |
| JP | 2013005186 A | 1/2013 |
| KR | 20160045746 A | 4/2016 |
| TW | 201412176 A | 3/2014 |
| WO | 2008092475 A1 | 8/2008 |
| WO | 2015025048 A2 | 2/2015 |
| WO | 2015184962 A1 | 12/2015 |
| WO | 2016015764 A1 | 2/2016 |
| WO | 2016070682 A1 | 5/2016 |

OTHER PUBLICATIONS

Supplementary European Search Report in European application No. 16906663.6, dated Dec. 13, 2018.
International Preliminary Report on Patentability in international application No. PCT/CN2016/087745, dated Jan. 1, 2019, with English translation provided by WIPO.
International Search Report in international application No. PCT/CN2016/087745, dated Mar. 1, 2017.
Written Opinion of the International Search Authority in international application No. PCT/CN2016/087745, dated Mar. 1, 2017.
First Office Action of the Japanese application No. 2018-557106, dated Jun. 19, 2020.
Office Action of the Indian application No. 201817047540, dated Jul. 8, 2020.
First Office Action of the Taiwanese application No. 106119697, dated Oct. 21, 2020.
First Office Action of the Chinese application No. 201680084906.3, dated Nov. 4, 2020.
First Office Action of the European application No. 16906663,6, dated Dec. 1, 2020.
Notice of Allowance of the Japanese application No. 2018-557106, dated Feb. 2, 2021.
Decision of Rejection of the Taiwanese application No. 106119697, dated Mar. 24, 2021.

* cited by examiner

D2D COMMUNICATION METHOD AND D2D DEVICE

CROSS-REFERENCE TO RELATED APPLICATION

The present application is the U.S. national phase of PCT Application PCT/CN2016/087745 filed on Jun. 29, 2016, entitled "D2D COMMUNICATION METHOD AND D2D DEVICE", the disclosure of which is hereby incorporated by reference in its entirety.

TECHNICAL FIELD

Embodiments of the disclosure relate to the field of wireless communications, and more particularly to a Device to Device (D2D) communication method and a D2D device.

BACKGROUND

In the 3rd Generation Partnership Project (3GPP) protocol, D2D communication has been standardized. With continuous development of the Internet of vehicles, automobile will gradually participate more and more in information transmission and communication as a mobile platform, and interactions between vehicles and terminals and between vehicles and vehicles will certainly get increasingly frequent. A Vehicle to Vehicle (V2V) technology and a Vehicle to X (V2X) technology become research hot spots, which brings many problems. For example, in a PC5-interface-based V2X communication process, when a distance between sending and receiving vehicles exceeds a certain range, it is necessary to increase transmitting power to ensure service continuity of V2V communication. When the distance between the vehicles continues to increase, the problem may still not be solved by simply increasing the transmitting power and it is necessary to forward information by multiple-hop replay between the sending and receiving vehicles. However, during network-control-free V2X communication, a competition mechanism is adopted for information sending between devices, and when some important information (for example, information associated with a traffic condition and traffic congestion information) is required to be forwarded (relayed) by different vehicles, a large amount of other information may also be forwarded. Thus, it is likely to cause network congestion and make it impossible for the other vehicles to acquire the important information.

SUMMARY

The embodiments of the disclosure provide a D2D communication method and a D2D device, which solve the problem of congestion caused by massive information forwarding in D2D communication.

In a first aspect, there is provided a D2D communication method, which may include that a first terminal device determines information to be forwarded, here, the information to be forwarded includes target information and forwarding condition information; and the first terminal device sends the information to be forwarded, so that upon reception of the information to be forwarded, a second terminal device determines whether to forward the information to be forwarded according to the forwarding condition information.

In such a manner, according to the D2D communication method of the embodiments of the disclosure, information forwarding devices are filtered to only enable a terminal device consistent with a certain condition to forward the information to be forwarded, so that congestion caused by massive information forwarding is avoided.

As another embodiment, the forwarding condition information may include at least one of position condition information or time condition information.

As another embodiment, the position condition information may include at least one of: a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and the first terminal device or a maximum distance between a terminal device required to forward the information to be forwarded and the first terminal device.

As another embodiment, the time condition information may include a moment at which the information to be forwarded is sent and a maximum time period during which the information to be forwarded needs to be forwarded, or the time condition information may include a forwarding ending time for the information to be forwarded.

As another embodiment, the information to be forwarded may include attribute information of the first terminal device and indication information, and the indication information indicates that the second terminal device sends attribute information of the second terminal device along with the information to be forwarded.

As another embodiment, the attribute information may include position information and at least one of information: sending time information, type information of a terminal device or identity information of a terminal device.

As another embodiment, the operation that the first terminal device sends the information to be forwarded may include that:

the first terminal device sends the information to be forwarded in a broadcast manner.

As another embodiment, the first terminal device may be a vehicle-mounted device, and the target information may include user requirement information of the first terminal device or present traffic condition information.

In a second aspect, there is provided a D2D communication method, which may include that a second terminal device receives information to be forwarded sent by a first terminal device, here, the information to be forwarded includes target information and forwarding condition information; and the second terminal device determines whether to forward the information to be forwarded according to the forwarding condition information.

In such a manner, whether to forward the information to be forwarded is determined through the forwarding condition information, and then a terminal device inconsistent with a condition is not required to forward the information to be forwarded, so that congestion caused by massive information forwarding is avoided.

As another embodiment, the operation that the second terminal device determines whether to forward the information to be forwarded according to the forwarding condition information may include that when the second terminal device meets a forwarding condition indicated by the forwarding condition information, the information to be forwarded is determined to be forwarded; and when the second terminal device does not meet the forwarding condition indicated by the forwarding condition information, the information to be forwarded is forbidden to be forwarded.

As another embodiment, the forwarding condition information may include at least one of position condition information or time condition information, and the operation that the second terminal device determines whether to forward the information to be forwarded according to the forwarding condition information may include that the second terminal device determines whether to forward the information to be forwarded according to at least one of: the position condition information and a position of the second terminal device, or the time condition information and a time at which the second terminal device receives the information to be forwarded.

As another embodiment, the position condition information may include at least one of: a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and the first terminal device or a maximum distance between a terminal device required to forward the information to be forwarded and the first terminal device.

As another embodiment, the time condition information may include a moment at which the information to be forwarded is sent and a maximum time period during which the information to be forwarded needs to be forwarded, or the time condition information may include a forwarding ending time for the information to be forwarded.

As another embodiment, the information to be forwarded may include attribute information of the first terminal device and indication information, and the method may further include that when the second terminal device determines to forward the information to be forwarded, the second terminal device determines forwarding information according to the indication information, here, the forwarding information includes the information to be forwarded and attribute information of the second terminal device; and the second terminal device forwards the forwarding information.

As another embodiment, the attribute information may include position information and at least one of information: sending time information, type information of a terminal device or identity information of a terminal device.

As another embodiment, the operation that the second terminal device forwards the forwarding information may include that the second terminal device broadcasts the forwarding information.

In a third aspect, there is provided a D2D communication method, which may include that a first terminal device determines information to be forwarded, here, the information to be forwarded includes target information, attribute information of the first terminal device and indication information; and the first terminal device sends the information to be forwarded, here, the indication information indicates that a second terminal device sends attribute information of the second terminal device along with the information to be forwarded.

As another embodiment, the attribute information may include position information and at least one of information: sending time information, type information of a terminal device or identity information of a terminal device.

As another embodiment, the operation that the first terminal device sends the information to be forwarded may include that the first terminal device sends the information to be forwarded in a broadcast manner.

In such a manner, a terminal device may acquire a forwarding path of the received information to be forwarded through the indication information.

In a fourth aspect, there is provided a D2D communication method, which may include that a second terminal device receives information to be forwarded sent by a first terminal device, here, the information to be forwarded includes target information, attribute information of the first terminal device and indication information; the second terminal device determines forwarding information according to the indication information, here, the forwarding information includes the information to be forwarded and attribute information of the second terminal device; and the second terminal device sends the forwarding information.

In such a manner, a terminal device may determine a forwarding path of the received information to be forwarded through the indication information.

As another embodiment, the attribute information may include position information and at least one of information: sending time information, type information of the terminal device or identity information of the terminal device.

As another embodiment, the method may further include that after the second terminal device receives the information to be forwarded sent by the first terminal device, the second terminal device determines transmission paths for the information to be forwarded according to the information to be forwarded, here, the transmission paths include position information of terminal devices participating in forwarding of the information to be forwarded.

In a fifth aspect, there is provided a D2D device, which may be configured to execute each process executed by a first terminal device in the D2D communication method in the first aspect and each implementation mode. The D2D device includes a determination module, configured to determine information to be forwarded, here, the information to be forwarded includes target information and forwarding condition information; and a sending module, configured to send the information to be forwarded determined by the determination module, so that upon reception of the information to be forwarded, a second terminal device determines whether to forward the information to be forwarded according to the forwarding condition information.

In a sixth aspect, there is provided a D2D device, which may be configured to execute each process executed by a second terminal device in the D2D communication method in the second aspect and each implementation mode. The D2D device includes a receiving module, configured to receive information to be forwarded sent by a first terminal device, here, the information to be forwarded includes target information and forwarding condition information; and a determination module, configured to determine whether to forward the information to be forwarded according to the forwarding condition information received by the receiving module.

In a seventh aspect, there is provided a D2D device, which may be configured to execute each process executed by a first terminal device in the D2D communication method in the third aspect and each implementation mode. The D2D device includes a determination module, configured to determine information to be forwarded, here, the information to be forwarded includes target information, attribute information of a first terminal device and indication information; and a sending module, configured to send the information to be forwarded determined by the determination module, here, the indication information indicates that a second terminal device sends attribute information of the second terminal device along with the information to be forwarded.

In an eighth aspect, there is provided a D2D device, which may be configured to execute each process executed by a second terminal device in the D2D communication method in the fourth aspect and each implementation mode. The D2D device includes a receiving module, configured to receive information to be forwarded sent by a first terminal device, here, the information to be forwarded includes target information, attribute information of the first terminal device and indication information; a determination module, configured to determine forwarding information according to the indication information received by the receiving module, here, the forwarding information includes the information to be forwarded and attribute information of a second terminal device; and a sending module, configured to send the forwarding information determined by the determination module.

In a ninth aspect, there is provided another D2D device, which includes a storage unit and a processor, here, the storage unit is configured to store an instruction that when executed by the processor cause the processor to perform the method in the first aspect or any possible implementation mode of the first aspect.

In a tenth aspect, there is provided another D2D device, which includes a storage unit and a processor, here, the storage unit is configured to store an instruction that when executed by the processor cause the processor to perform the method in the second aspect or any possible implementation mode of the second aspect.

In an eleventh aspect, there is provided another D2D device, which includes a storage unit and a processor, here, the storage unit is configured to store an instruction that when executed by the processor cause the processor to perform the method in the third aspect or any possible implementation mode of the third aspect.

In a twelfth aspect provides another D2D device, which includes a storage unit and a processor, here, the storage unit is configured to store an instruction that when executed by the processor cause the processor to perform the method in the fourth aspect or any possible implementation mode of the fourth aspect.

In a thirteenth aspect, there is provided a computer-readable medium, which is configured to store a computer program, and the computer program includes an instruction configured to execute the method in the first aspect or any possible implementation mode of the first aspect.

In a fourteenth aspect, there is provided a computer-readable medium, which is configured to store a computer program, and the computer program includes an instruction configured to execute the method in the second aspect or any possible implementation mode of the second aspect.

In a fifteenth aspect, there is provided a computer-readable medium, which is configured to store a computer program, and the computer program includes an instruction configured to execute the method in the third aspect or any possible implementation mode of the third aspect.

In a sixteenth aspect, there is provided a computer-readable medium, which is configured to store a computer program, and the computer program includes an instruction configured to execute the method in the fourth aspect or any possible implementation mode of the fourth aspect.

On the basis of the technical solutions, in the embodiments of the disclosure, information forwarding devices are filtered to only enable a terminal device consistent with a certain condition to forward the information to be forwarded, so that congestion caused by massive information forwarding is avoided.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced LTE (LTE-A) system, a Universal Mobile Telecommunication System (UMTS) and a future 5th-Generation (5G) communication system.

In some embodiments, D2D communication may refer to V2V communication or V2X communication. In V2X communication, X may generally refer to any device with a wireless receiving and sending capability, for example, but not limited to, a wireless device moving at a low speed, a vehicle-mounted device moving at a high speed or a network control node with a wireless transmitting and receiving capability. There are no limits made thereto in the disclosure.

It is to be understood that the embodiments of the disclosure are mainly applied to a V2X communication scenario but may also be applied to any other D2D communication scenario. There are no limits made thereto in the embodiments of the disclosure.

There are two communication manners for VX2 communication, One manner is direct D2D communication between devices, called PC5-interface-based communication. The other is communication based on a User Equipment to Universal (UU) interface in an existing LTE system. In such a manner, D2D communication is implemented by forwarding of a base station, i.e., device-base station-device. In the embodiments of the disclosure, information interaction between devices is implemented on the basis of a PC5 interface. When a terminal device sends, on the PC5 interface, a message which is required to be forwarded by another terminal device, the terminal device is required to append a certain forwarding condition, the other terminal device, before forwarding the message, is required to judge whether the other terminal device meets the forwarding condition, and the other terminal device, when forwarding the message, is also required to forward the forwarding condition contained in the message.

Figure 1:
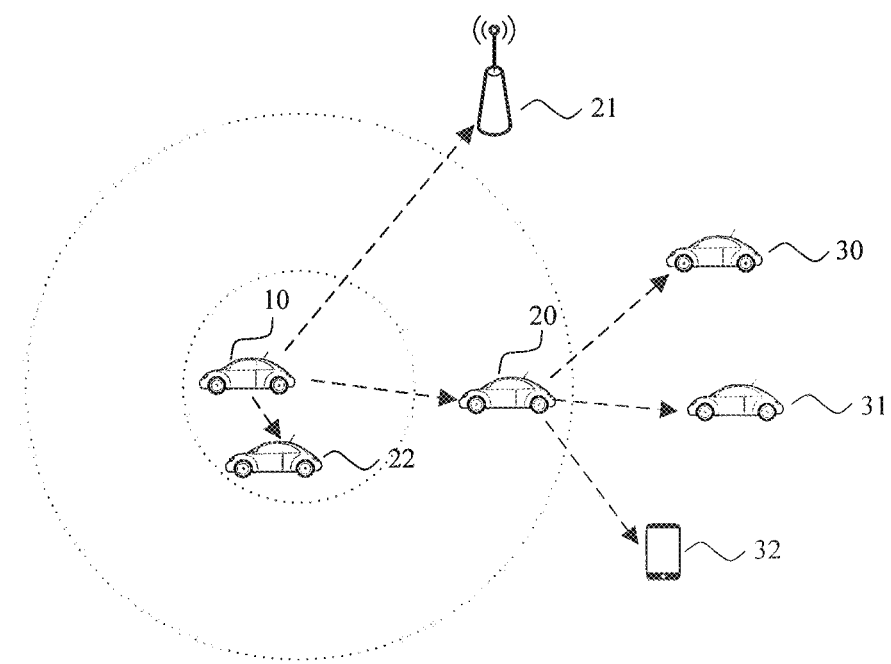
FIG. 1 is a schematic diagram of an application scenario according to an embodiment of the disclosure.

FIG. 1 is a schematic diagram of an application scenario according to an embodiment of the disclosure. In FIG. 1, descriptions are made with a V2X communication scenario as an example. However, the embodiment of the disclosure may also be applied to any other D2D communication scenario. There are no limits made thereto in the disclosure. Some terminal devices participating in information transmission in a complete D2D communication link are illustrated in FIG. 1. A terminal device 10 sends a message to a terminal device 20, a terminal device 21 and a terminal device 22. There is made such a hypothesis that the terminal device 20 meets a forwarding condition but the terminal device 21 and the terminal device 22 do not meet the forwarding condition, the terminal device 20 forwards the message and, for example, may forward the message to a terminal device 30, a terminal device 31 and a terminal device 32. The terminal device 21 and the terminal device 22 do not forward the message.

Different terminal devices illustrated in FIG. 1 may include a vehicle-mounted terminal moving at a high speed, for example, the terminal device 10, the terminal device 20, the terminal device 22, the terminal device 30 and the terminal device 31, or a network control node with a wireless transmitting and receiving capability, for example, the terminal device 21, or a wireless device moving at a low speed, for example, the terminal device 32. However, types of the terminal devices participating in D2D communication are not limited in the embodiment of the disclosure. The terminal devices may also be other D2D devices with a wireless receiving and sending capability.

Figure 2:
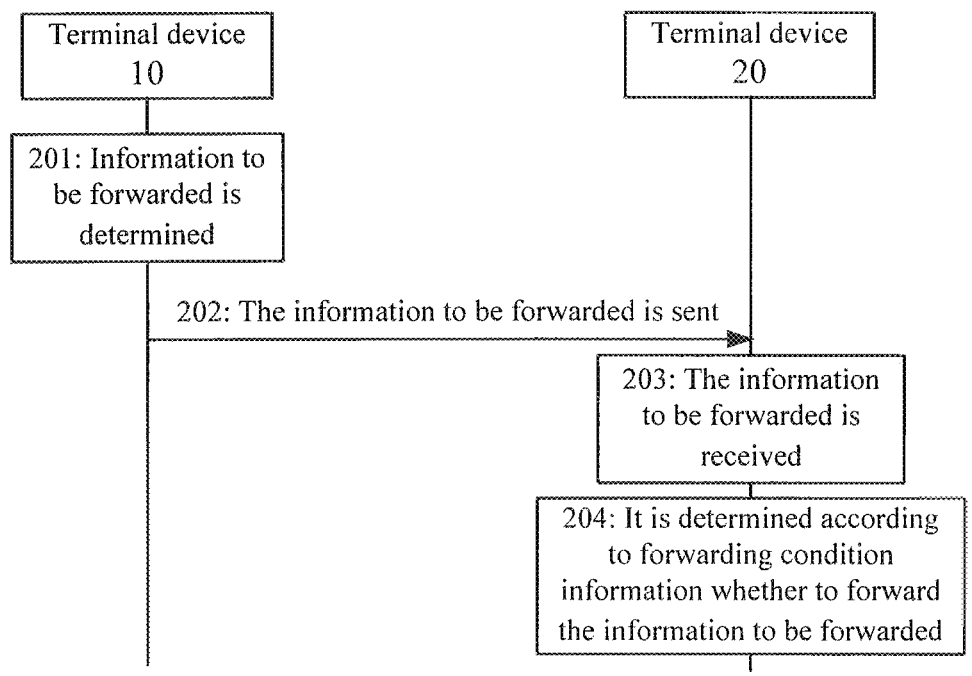
FIG. 2 is an interaction flowchart of a D2D communication method according to an embodiment of the disclosure.

FIG. 2 is an interaction flowchart of a D2D communication method according to an embodiment of the disclosure. Here, descriptions will be made with a terminal device 10 and a terminal device 20 as an example. However, the embodiment of the disclosure is not limited thereto. In the communication method of the embodiment of the disclosure, the terminal device 10 may send information to be forwarded to multiple terminal devices including the terminal device 20. A method executed by another terminal device receiving the information to be forwarded may refer to a method executed by the terminal device 20. As illustrated in FIG. 2, the D2D communication method includes the following operations.

In 201, the terminal device 10 determines the information to be forwarded, here, the information to be forwarded includes target information and forwarding condition information.

Specifically, the terminal device 10 determines the information to be forwarded which is required to be forwarded to another terminal device. The information to be forwarded not only includes the target information but also includes the forwarding condition information, the forwarding condition information indicates whether the target information may be continued to be forwarded. Optionally, the target information includes user requirement information of the terminal device 10 or present traffic condition information. When another terminal device, for example, the terminal device 20, receives the information to be forwarded, the terminal device 20 may determine whether to continue forwarding the information to be forwarded according to the forwarding condition information in the information to be forwarded. If the terminal device 20 does not meet a forwarding condition indicated by the forwarding condition information, the terminal device 20 will not forward the information to be forwarded. If the terminal device 20 meets the forwarding condition indicated by the forwarding condition information, the terminal device 20 continues forwarding, the information to be forwarded to another terminal device, and the information to be forwarded includes the forwarding condition information.

Optionally, the forwarding condition information includes at least one of position condition information or time condition information.

That is, the forwarding condition indicated by the forwarding condition information may be a geographical-position-based condition, may also be a time-based condition and may further be a geographical position and time based condition.

In a V2X communication process, either traffic information or discovery between terminal devices is meaningful only within a certain position range. Therefore, the terminal device 10 may append an effective position range for the target information when the terminal device 10 sends, on a PC5 interface, the target information which is required to be forwarded by another terminal device. Only within a certain geographical position range, the target information is effective or it is necessary to continue forwarding the target information to another device.

Optionally, the position condition information may include at least one of information: a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and a first terminal device or a maximum distance between a terminal device required to forward the information to be forwarded and the first terminal device.

For example, there is made such a hypothesis that the forwarding condition information includes the longitude coordinate range of the terminal device required to forward the information to be forwarded and the latitude coordinate range of the terminal device required to forward the information to be forwarded. Moreover, the terminal device 10 encounters serious traffic congestion in a driving process and is required to tell another terminal device a traffic congestion message, i.e., the target information. If a traffic congestion region ranges from 116°23'17" east longitude and 39°54'59" north latitude to 116°30'18" east longitude and 39°55'00" north latitude, the terminal device 10 is required to notify terminal devices of which geographical positions are within a geographical position range from 116°23'15" east longitude and 39°54'58" north latitude to 116°30'20" east longitude and 39° 55'01" north latitude that traffic congestion occurs in the geographical position range, and forwarding condition information in the traffic congestion message includes the geographical position range. Since the terminal devices in the geographical position range are greatly influenced by the traffic congestion, these terminal devices, after receiving the traffic congestion message, may regulate their own drive routes or change transportation vehicle to avoid occurrence of more serious traffic congestion and a traffic accident caused by a relatively high traffic flow. Other terminal devices out of the geographical position range are influenced less by the traffic congestion, so that it is unnecessary to forward the traffic congestion message to the other terminal devices, network congestion caused by massive information forwarding may be avoided, and the traffic congestion message may be timely and accurately received by the terminal devices requiring it.

For another example, there is made such a hypothesis that the terminal device 10 sends the information to be forwarded to another terminal device, the target information in the information to be forwarded is information indicating that traffic congestion occurs in a region where the terminal device 10 is presently located, and the forwarding condition information in the information to be forwarded includes a minimum distance $R_{min}$ between the terminal device required to forward the information to be forwarded and the first terminal device and a maximum distance $R_{max}$ between the terminal device required to forward the information to be forwarded and the first terminal device. After the terminal device 10 sends the information to be forwarded including the forwarding condition information, only a terminal device meeting the forwarding condition indicated by the forwarding condition information may forward the information to be forwarded, that is, only a terminal device at a distance in a range of $R_{min}$ to $R_{max}$ from the terminal device 10 forwards the information to be forwarded. If a distance between a certain terminal device receiving the information to be forwarded and the terminal device 10 is less than or a distance between a certain terminal device receiving the information to be forwarded and the terminal device 10 is greater than $R_{max}$, the certain terminal device does not forward the information to be forwarded. This is because, in the V2X communication process, such forwarding makes very little sense if a distance between two terminal devices is very close. For example, for two vehicles driving in parallel in the same direction on two lanes of the same road respectively, their effective coverage may be considered to be substantially consistent, and unnecessary forwarding between the two vehicles may be avoided to reduce network congestion. If a distance between two terminal devices is very long, influence of a traffic condition of one terminal device on the other terminal device may be ignored.

Optionally, if the forwarding condition information includes at least one of the minimum distance between the terminal device required to forward the information to be forwarded and the first terminal device, or the maximum distance between the terminal device required to forward the information to be forwarded and the first terminal device, the information to be forwarded sent by the terminal device 10 may further include position information of the terminal device 10, so that the other terminal device, after receiving the information to be forwarded, may determine a distance between the other terminal device and the terminal device 10 according to the position information.

In the V2X communication process, there may be a time limit to some information, for example, propagation of real-time traffic information. Therefore, the terminal device 10, when sending the target information, may append an effective time range for the target information for sending together.

Optionally, the time condition information includes a moment at which the information to be forwarded is sent and a maximum time period during which the information to be forwarded needs to be forwarded, or the time condition information includes a forwarding ending time for the information to be forwarded.

The moment at which the information to be forwarded is sent or the forwarding ending time may be represented by timestamps and, for example, Universal Time Coordinated (UTC)-based timestamp. The maximum time period during which information to be forwarded needs to be forwarded may be a specific timestamp and may also be a time length.

For example, a traffic police is handling a traffic dispute ahead in a driving process of the terminal device 10 and time for handling the traffic dispute is about 5 minutes. The terminal device 10 sends information to be forwarded to notify another terminal device of 5-minute slow moving traffic ahead, and the information to be forwarded not only includes target information, i.e., information about the traffic dispute, but also includes time information, i.e., 5 minutes, and information about a moment, for example, 14:00, at which the terminal device 10 sends the information to be forwarded. The other terminal device, when receiving the information to be forwarded, may judge whether to continue forwarding the information to be forwarded according to the forwarding condition information. If a moment at which a certain terminal device receives an initial message is 14:02, it may be determined according to the forwarding condition information that 14:02 is within 14:00-14:05, which indicates that the traffic dispute has not been handled, and the information to be forwarded is continued to be sent to another terminal device. If a moment at which a certain terminal device receives the information to be forwarded is 14:07, it may be determined according to the forwarding condition information that 14:07 is later than 14:05, which indicates that the traffic dispute has been handled, and the information to be forwarded including the forwarding condition is not required to be forwarded any more. Therefore, network congestion is reduced and other important information may be timely forwarded.

In 202, the terminal device 10 sends the information to be forwarded.

Specifically, the terminal device 10, after determining the information to be forwarded which is required to be sent, sends the information to be forwarded. The information to be forwarded includes the target information and the forwarding condition information, and the forwarding condition information indicates whether the target information may be continued to be forwarded.

Optionally, the terminal device 10 sends the information to be forwarded in a broadcast manner.

In 203, the terminal device 20 receives the information to be forwarded sent by the terminal device 10.

Specifically, after the terminal device 10 sends the information to be forwarded, the terminal device 20 receives the information to be forwarded sent by the terminal device 10. The information to be forwarded includes the target information and the forwarding condition information. The terminal device 20 determines whether to forward the information to be forwarded according to the forwarding condition information.

It is to be understood that descriptions are made herein with the condition that the terminal device 20 receives the information to be forwarded sent by the terminal device 10. The information to be forwarded sent by the terminal device 10 may also be received by another terminal device. The other terminal device, after receiving the information to be forwarded, may execute the method the same as that executed by the terminal device 20, which will not be elaborated herein for simplicity.

Optionally, the terminal device 20 receives the information to be forwarded sent by the terminal device 10 in the broadcast manner.

In 204, the terminal device 20 determines whether to forward the information to be forwarded, according to the forwarding condition information.

Specifically, the terminal device 20 receives the information to be forwarded from the terminal device 10. The information to be forwarded includes the target information and the forwarding condition information. The terminal device 20 determines whether to forward the information to be forwarded to another terminal device according to the forwarding condition information in the information to be forwarded. The forwarding condition information may include at least one of the position condition information or the time condition information. If the terminal device 20 meets the forwarding condition indicated by the forwarding condition information, the mobile device 20 determines to forward the information to be forwarded. If the terminal device 20 does not meet the forwarding condition indicated by the forwarding condition information, the terminal device 20 forbids forwarding the information to be forwarded. It is to be understood that if the terminal device 20 determines to forward the target information according to the forwarding condition information, the terminal device 20 may also forward the forwarding condition information together when forwarding the target information.

For example, if the forwarding condition information includes the minimum distance between the terminal device required to forward the information to be forwarded and the first terminal device and the maximum distance between the terminal device required to forward the information to be forwarded and the first terminal device, the information to be forwarded received by the terminal device 20 may further include the position information of the terminal device 10. Therefore, the terminal device 20 may determine whether the distance between the terminal device 20 and the terminal device 10 meets requirements of the minimum distance and the maximum distance according to the position information of the terminal device 10 and the position of the terminal device 20, and determine whether to forward the information to be forwarded. There is made such a hypothesis that the terminal device 20 receives the information to be forwarded sent by the terminal device 10, the information to be forwarded includes the target information and the forwarding condition information, the target information indicates that traffic congestion occurs at the position at which the terminal device 10 is located and the forwarding condition information includes the minimum distance $R_{min}=500$ m between the terminal device required to forward the information to be forwarded and the first terminal device and the maximum distance $R_{max}=5$ km between the terminal device required to forward the information to be forwarded and the first terminal device. The terminal device 20 may further receive the position information of the terminal device 10 from the terminal device 10. For example, the terminal device 10 is located at 116°23'17" east longitude and 39°54'59" north latitude. The terminal device 20 determines its own position to be 116°23'17" east longitude and 39°56'62" north latitude. Then, the terminal device 20 calculates the distance between the terminal device 20 and the terminal device 10 to be $R=2$ km according to the position information of the terminal device 10 and position information of the terminal device 20. Therefore, the position of the terminal device 20 is greater than the minimum distance and is less than the maximum distance, and the terminal device 20 is required to forward the initial message and simultaneously forward the position information of the terminal device 20, i.e., the position information indicating that the terminal device 20 is located at 116°23'17" east longitude and 39°56'62" north latitude, to notify another terminal device of the congestion message, so that the other terminal device, after receiving the traffic congestion message, may regulate its drive route or change transportation means. If the terminal device 20 determines its own position to be 116°23'17" east longitude and 39°54'58" north latitude, the terminal device 20 calculates the distance between the terminal device 20 and the first terminal device 10 to be $R=100$ m according to the position information of the terminal device 10 and the position information of the terminal device 20. Therefore, the position of the terminal device 20 is less than the minimum distance, which indicates that the terminal device 20 is at a position only 100 m far away from the terminal device 10 and coverage areas of the terminal device 20 and the terminal device 10 are substantially the same. For reducing unnecessary information forwarding, the terminal device 20 forwards the initial message to be forwarded. If the terminal device 20 determines its own position to be 116°23'17" east longitude and 39°52'62" north latitude, the terminal device 20 determines the distance between the terminal device 20 and the first terminal device 10 to be $R=7$ km according to the position information of the terminal device 10 and the position information of the terminal device 20. Therefore, the position of the terminal device 20 is greater than the maximum distance, which indicates that the terminal device 20 is at a position 7 km far away from the terminal device 10, has gotten far beyond a present congestion range and may be influenced little by the congestion condition, and the terminal device 20 is not required to forward the initial message any more.

In such a manner, according to the D2D communication method of the embodiment of the disclosure, devices that forward information are filtered to only enable a terminal device consistent with a certain condition to forward the information to be forwarded, so that congestion caused by massive information forwarding is avoided.

In some scenarios, not only the forwarded information but also path (topology structure) information in the forwarded information are useful. For example, when V2X communication is applied to the field of public safety such as traffic accident rescue and disaster relief, a forwarding path for V2X information may be useful information. When the terminal device 10 sends, on the PC5 interface, the information required to be forwarded, the terminal device 10 may require terminal device forwarding the information to append attribute information of the terminal device forwarding the information, for sending together along with the information.

Figure 3:
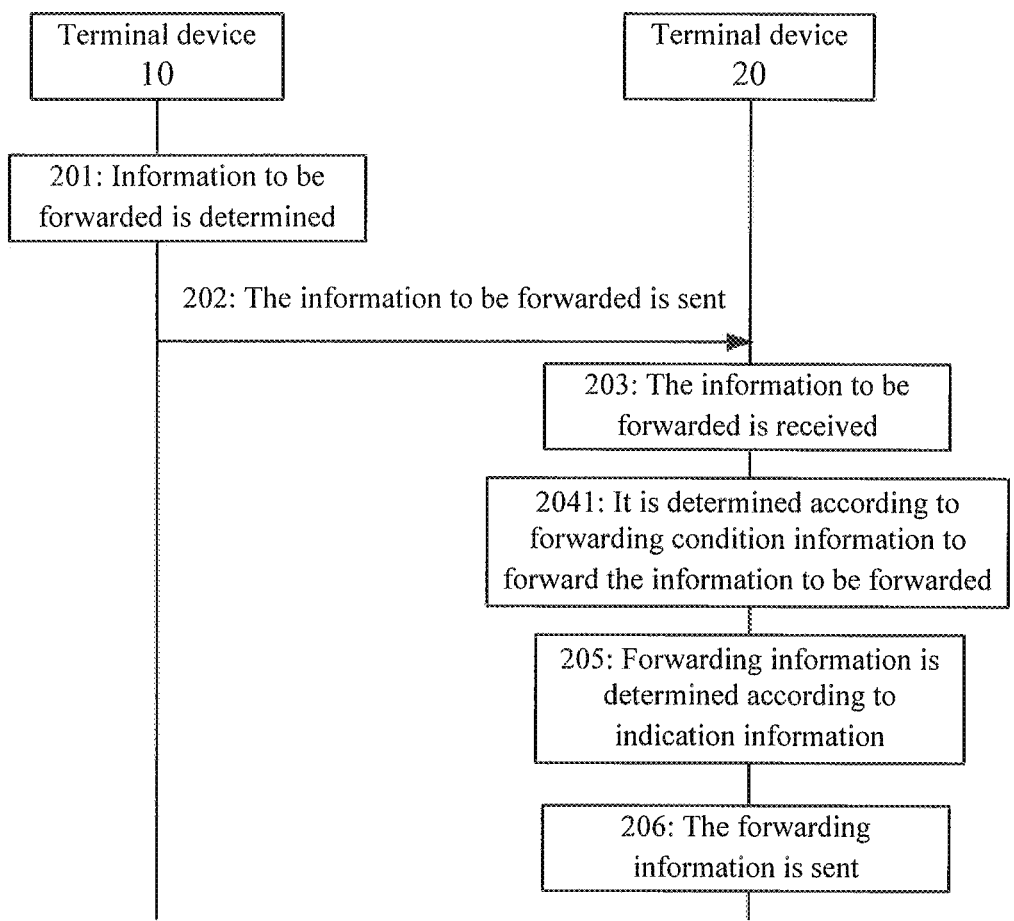
FIG. 3 is an interaction flowchart of a D2D communication method according to another embodiment of the disclosure.

Optionally, FIG. 3 is an interaction flowchart of a D2D communication method according to another embodiment of the disclosure. The information to be forwarded determined by the terminal device 10 in 201 not only includes the target information and the forwarding condition information but also may include attribute information of the terminal device 10 and indication information. In 202, the terminal device 10 sends the information to be forwarded. In 203, the terminal device 20, when receiving the information to be forwarded sent by the terminal device 10, may not only acquire the target information and the forwarding condition information but also acquire the attribute information of the terminal device 10 and the indication information. In the embodiment, the indication information indicates that the terminal device 20 sends attribute information of the terminal device 20 along with the information to be forwarded. In 204, if the terminal device 20 determines the information to be forwarded according to the forwarding condition information in the information to be forwarded, the D2D communication method may further include 2041, 205 and 206. 204 may be replaced with 2041.

In 205, the terminal device 20 determines forwarding information according to the indication information.

The terminal device 20 receives the information to be forwarded sent by the terminal device 10 and determines the forwarding information according to the indication information in the information to be forwarded. The forwarding information includes the information to be forwarded and the attribute information of the terminal device 20.

Optionally, the attribute information includes the position information and at least one of information: sending time information, type information of the terminal device 20 or identity information of the terminal device 20.

The type information of the terminal device 20 refers to a type of the terminal device and, for example, indicates that the terminal device is a vehicle-mounted device moving at a high speed, a wireless device moving at a low speed or a network control node with a wireless transmitting and receiving capability. Different types of terminal devices may be identified with different type identifiers.

In addition, the identity information of the terminal device refers to a respective different identifier of each terminal. For example, in a V2V communication process, a license plate number of each automobile may be determined as respective identity information. If the identity information of the terminal device is known, the terminal device may be uniquely determined.

Specifically, the terminal device 10 sends the information to be forwarded. The information to be forwarded includes the target information, the forwarding condition information, the attribute information of the terminal device 10 and the indication information. After the terminal device 20 receives the information to be forwarded, if the terminal device 20 determines to forward the information to be forwarded according to the forwarding condition information in the information to be forwarded, the terminal device 20 may further determine the forwarding information according to the indication information. The forwarding information not only includes the information to be forwarded but also includes the attribute information of the terminal device 20.

In 206, the terminal device 20 sends the forwarding information.

Specifically, after the terminal device 20 receives the information to be forwarded sent by the terminal device 10 from the terminal device 10, if the terminal device 20 determines to forward the information to be forwarded, the terminal device 20 may determine the forwarding information according to the indication information. The forwarding information not only includes the information to be forwarded but also includes the attribute information of the terminal device 20. Therefore, a terminal device receiving the forwarding information sent by the terminal device 20 may acquire the attribute information of the terminal device 20 and the attribute information of the terminal device 10 from the forwarding information to further determine transmission paths for the information to be forwarded. The transmission paths include the position information of the terminal devices participating in forwarding of the information to be forwarded. A path topology structure may be determined according to the information to be forwarded received from different terminal devices. In such a manner, a terminal device may obtain positions and distribution of other terminals and may direct rescue operations in some special scenarios, for example, a disaster relief site.

Figure 4:
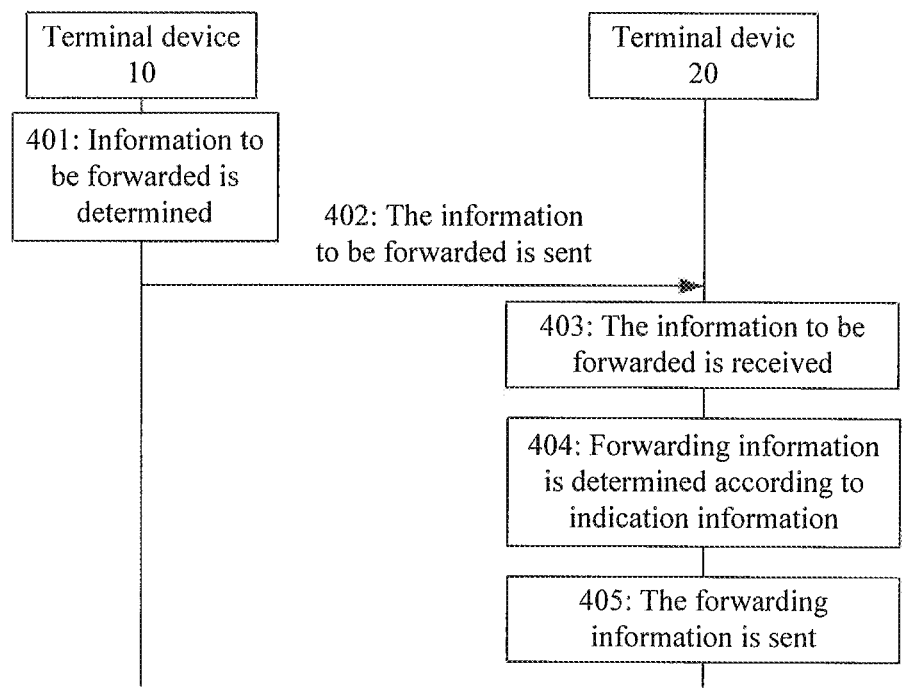
FIG. 4 is an interaction flowchart of a D2D communication method according to another embodiment of the disclosure.

FIG. 4 is an interaction flowchart of a D2D communication method according to another embodiment of the disclosure. Here, descriptions will be made with a terminal device 10 and a terminal device 20 as an example. However, the embodiment of the disclosure is not limited thereto. In the communication method of the embodiment of the disclosure, the terminal device 10 may send information to be forwarded to multiple terminal devices including the terminal device 20. A method executed by another terminal device may refer to a method executed by the terminal device 20. As illustrated in FIG. 4, the D2D communication method includes the following operations.

In 401, the terminal device 10 determines the information to be forwarded.

Specifically, the terminal device 10 determines the information to be forwarded which is required to be forwarded to another terminal device. The information to be forwarded includes target information, attribute information of the terminal device 10 and indication information. The indication information indicates that the terminal device 20 sends attribute information of the terminal device 20 along with the information to be forwarded.

Optionally, the attribute information includes position information and at least one of: sending time information, type information of the terminal device or identity information of the terminal device.

In 402, the terminal device 10 sends the information to be forwarded.

Specifically, the terminal device 10, after determining the information to be forwarded which is required to be sent, sends the information to be forwarded. The information to be forwarded includes the target information, the attribute information of the terminal device 10 and the indication information.

Optionally, the terminal device 10 sends the information to be forwarded in a broadcast manner.

In 403, the terminal device 20 receives the information to be forwarded.

Specifically, after the terminal device 10 sends the information to be forwarded, the terminal device 20 receives the information to be forwarded sent by the terminal device 10. The information to be forwarded includes the target information, the attribute information of the terminal device 10 and the indication information. The terminal device 20 determines forwarding information according to the indication information. The forwarding information includes the information to be forwarded and the attribute information of the terminal device 20.

It is to be understood that descriptions are made herein with an example that the terminal device 20 receives the information to be forwarded sent by the terminal device 10. The information to be forwarded sent by the terminal device 10 may also be received by another terminal device. The other terminal device, after receiving the information to be forwarded, may execute the method the same as that executed by the terminal device 20, which will not be elaborated herein for simplicity.

Optionally, the terminal device 20 receives the information to be forwarded sent by the terminal device 10 in the broadcast manner.

In 404, the terminal device 20 determines the forwarding information according to the indication information.

Specifically, the terminal device 10 sends the information to be forwarded to the terminal device 20. The information to be forwarded includes the target information, the attribute information of the terminal device 10 and the indication information. After the terminal device 20 receives the information to be forwarded from the terminal device 10, the terminal device 20 is required to send the information to be forwarded to another terminal device. The terminal device 20 determines the forwarding information according to the indication information in the information to be forwarded. The forwarding information not only includes the information to be forwarded but also includes the attribute information of the terminal device 20.

In 405, the terminal device 20 sends the forwarding information.

Specifically, after the terminal device 20 receives the information to be forwarded including the target information, the attribute information of the terminal device 10 and the indication information from the terminal device 10, the terminal device 20 may send the forwarding information determined by the terminal device 20 according to the indication information. The forwarding information not only includes the information to be forwarded but also includes the attribute information of the terminal device 20. A terminal device receiving the forwarding information may acquire the attribute information of the terminal device 20 and the attribute information of the terminal device 10 from the forwarding information, thereby determining a forwarding path of the information to be forwarded. Multiple paths may be determined according to the information to be forwarded received from different terminal devices, thereby forming a path topology structure.

Optionally, the method further includes that the terminal device 20 determines transmission paths for the information to be forwarded according to the information to be forwarded, here, the transmission paths include position information of the terminal devices participating in forwarding of the information to be forwarded.

Specifically, the terminal device 20 determines the forwarding information according to the indication information and forwards the forwarding information, here, the forwarding information includes the information to be forwarded and the attribute information of the terminal device 20. Another terminal device, after receiving the forwarding information sent by the terminal device 20, may obtain the position information of the terminal device 10 and the position information of the terminal device 20. That is, the terminal device receiving the forwarding information may determine a transmission path of the forwarding information. The terminal device receiving the forwarding information may further receive the forwarding information transmitted by other terminal devices through different paths and may also acquire information about multiple different paths for the information to be forwarded, thereby determining all paths in a transmission process of the information to be forwarded and forming a path topology structure.

In such a manner, each terminal device may obtain positions and distribution of other terminals and types of the terminal devices may be distinguished through type information of the terminal devices. Therefore, when obtaining the positions and distribution of the other terminals, the type of the device at each forwarding point may also be obtained to judge whether it is a vehicle, pedestrian or other for forwarding the information, and rescue operations may be directed in some special scenarios, for example, a disaster relief site. A sending terminal may use the formed topology structure to arrive at a specific terminal on the forwarding path (a forwarding terminal on the forwarding path). Therefore, forwarding efficiency in V2X communication may be improved (when the topology structure is used, only the specific terminal on the forwarding path is required to forward). This is of special significance for disaster relief and accident handling. In addition, vehicle position distribution information in V2X may also be obtained on the basis of geographical position information carried in the forwarding path, which is also helpful in the field of public safety (for example, disaster relief and accident handling).

Optionally, the method further includes that the terminal device 20 determines, according to multiple transmission paths for the information to be forwarded, a position distribution condition of multiple terminal devices participating in the forwarding of the information to be forwarded on the multiple transmission paths.

For example, there is made such a hypothesis that the attribute information includes the position information. There is also made such a hypothesis that a terminal device 30 receives the forwarding information sent by the terminal device 20. Then, the terminal device 30 may acquire a specific position of each vehicle according to the path topology structure, thereby determining a region with a relatively large traffic flow and a region with a relatively small traffic flow to select a drive route with a relatively small traffic flow to avoid more serious traffic congestion.

Optionally, the method further includes that the terminal device 20 determines a target transmission path in the multiple transmission paths for the information to be forwarded; and the terminal device 20 sends feedback information to the first terminal device according to the target transmission path.

For example, there is made such a hypothesis that the attribute information includes the position information, time information and identity information of the terminal device. There is also made such a hypothesis that the terminal device 30 receives the forwarding information sent by the terminal device 20. Then, the terminal device 30 may determine the transmission paths for the information to be forwarded according to the forwarding information and acquire the specific position of each vehicle and time cost in receiving the information to be forwarded from different paths. For example, the terminal device 10, the terminal device 20 and the terminal device 30 are located on a disaster relief site. The terminal device 30 receives the information to be forwarded sent by the terminal device 10 from different terminal devices through different paths. The information to be forwarded indicates that the terminal device 10 requires a support of another vehicle. If the time cost in transmission of the information to be forwarded on the corresponding path where the terminal device 30 receives the information to be forwarded sent by the terminal device 10 from the terminal device 20 is the shortest, the terminal device 30, if being capable of supporting the terminal device 10, may select to send feedback information to the first terminal device through the corresponding path, that is, the terminal device 30 sends the feedback information to the terminal device 10 through the terminal device 20, thereby notifying the terminal device 10 within shortest time. The feedback information may include identity information of the terminal device 30, identity information of the terminal device 20 and identity information of the terminal device 10, so that the feedback information may be finally transmitted to the terminal device 10 through the specified path according to the identity information of the terminal device.

It is to be understood that descriptions are made herein with an example that the terminal device 30 receives the forwarding information sent by the terminal device 20. The forwarding information sent by the terminal device 20 may also be received by another terminal device. The other terminal device, after receiving the forwarding information, may execute the method the same as that executed by the terminal device 30, which will not be elaborated herein for simplicity.

It is also to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

The D2D communication method according to the embodiments of the disclosure is described above in combination with FIG. 1 to FIG. 4 in detail. A D2D device according to the embodiments of the disclosure will be described below in combination with FIG. 5 to FIG. 16 in detail. It is to be understood that a network device and terminal device of the embodiments of the disclosure may execute various methods in the abovementioned embodiments of the disclosure. That is, the following specific working process of each device may refer to the corresponding process in the method embodiments.

Figure 5:
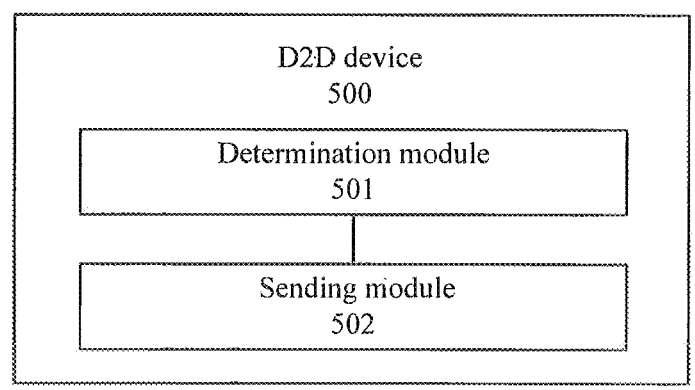
FIG. 5 is a structure block diagram of a D2D device according to an embodiment of the disclosure.

FIG. 5 is a schematic block diagram of a D2D device 500 according to an embodiment of the disclosure. As illustrated in FIG. 5, the D2D device 500 includes a determination module 501 and a sending module 502.

The determination module 501 is configured to determine information to be forwarded, here, the information to be forwarded includes target information and forwarding condition information.

The sending module 502 is configured to send the information to be forwarded determined by the determination module, so that upon reception of the information to be forwarded, a second terminal device determines, according to the forwarding condition information to enable a second terminal device to, when receiving the information to be forwarded, determine whether to forward the information to be forwarded.

Optionally, the forwarding condition information includes at least one of position condition information or time condition information.

Optionally, the position condition information includes at least one of: a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and a first terminal device or a maximum distance between a terminal device required to forward the information to be forwarded and the first terminal device.

Optionally, the time condition information includes a moment at which the information to be forwarded is sent and a maximum time period during which the information to be forwarded needs to be forwarded. Or the time condition information includes a forwarding ending time for the information to be forwarded.

Optionally, the information to be forwarded includes attribute information of the first terminal device and indication information. The indication information indicates that the second terminal device sends attribute information of the second terminal device along with the information to be forwarded.

Optionally, the attribute information includes position information and at least one of information: sending time information, type information of the terminal device or identity information of the terminal device.

Optionally, the sending module 502 is specifically configured to send the information to be forwarded in a broadcast manner.

Figure 6:
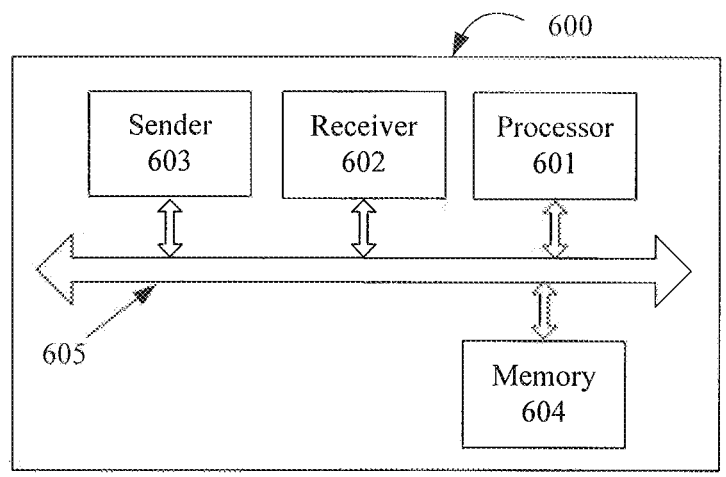
FIG. 6 is a structure block diagram of a D2D device according to an embodiment of the disclosure.

It is to be noted that in the embodiment of the disclosure, the determination module 501 may be implemented by a processor and the sending module 502 may be implemented by a sender. As illustrated in FIG. 6, a D2D device 600 may include a processor 601, a receiver 602, a sender 603 and a memory 604. The memory 604 may be configured to store an instruction and may further be configured to store a code executed by the processor 601 and the like. Each component in the D2D device 600 is coupled together through a bus system 605. The bus system 605 includes a data bus, and further includes a power bus, a control bus and a state signal bus. The processor 601 is specifically configured to determine information to be forwarded, here, the information to be forwarded including target information and forwarding condition information.

The sender 603 is configured to send the information to be forwarded determined by the processor 601, so that upon reception of the information to be forwarded, the second terminal determines, according to the forwarding condition information, whether to forward the information to be forwarded.

Optionally, the forwarding condition information includes at least one of position condition information or time condition information.

Optionally, the position condition information includes at least one of: a longitude coordinate range of a terminal device required to forward the information to be forwarded, a latitude coordinate range of the terminal device required to forward the information to be forwarded, a height coordinate range of the terminal device required to forward the information to be forwarded, a minimum distance between the terminal device required to forward the information to be forwarded and a first terminal device, or a maximum distance between the terminal device required to forward the information to be forwarded and the first terminal device.

Optionally, the time condition information includes a moment at which the information to be forwarded is sent and a maximum time period during which the information to be forwarded needs to be forwarded. Or the time condition information includes a forwarding ending time for the information to be forwarded.

Optionally, the information to be forwarded includes attribute information of the first terminal device and indication information. The indication information indicates that the second terminal device sends attribute information of the second terminal device along with the information to be forwarded.

Optionally, the attribute information includes position information and at least one of information: sending time information, type information of the terminal device or identity information of the terminal device.

Optionally, the sender 603 is specifically configured to send the information to be forwarded in a broadcast manner.

Figure 7:
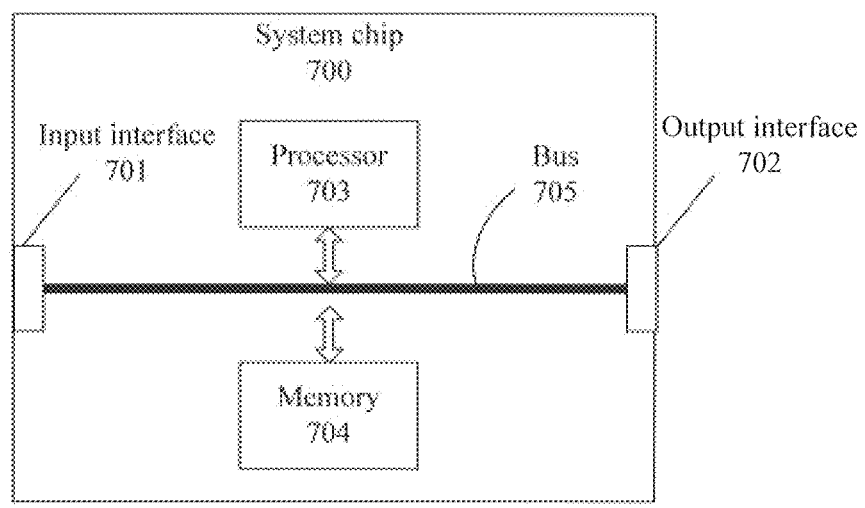
FIG. 7 is a schematic structure diagram of a system chip according to another embodiment of the disclosure.

FIG. 7 is a schematic structure diagram of a system chip according to an embodiment of the disclosure. The system chip 700 of FIG. 7 includes an input interface 701, an output interface 702, at least one processor 703 and a memory 704. The input interface 701, the output interface 702, the processor 703 and the memory 704 are connected through a bus 705. The processor 703 is configured to execute a code in the memory 704. When the code is executed, the processor 703 implements the method executed by a first terminal device in FIG. 2 or FIG. 3.

Figure 8:
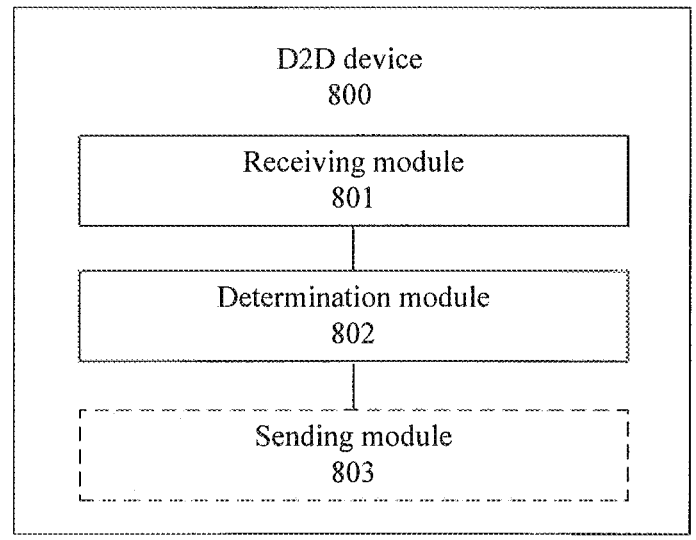
FIG. 8 is a structure block diagram of a D2D device according to another embodiment of the disclosure.

FIG. 8 is a schematic block diagram of a D2D device 800 according to an embodiment of the disclosure. As illustrated in FIG. 8, the D2D device 800 may include a receiving module 801, a determination module 802 and a sending module 803.

The receiving module 801 is configured to receive information to be forwarded sent by a first terminal device, here, the information to be forwarded includes target information and forwarding condition information.

The determination module 802 is configured to determine, according to the forwarding condition information received by the receiving module, whether to forward the information to be forwarded.

Optionally, the determination module 802 is specifically configured to, when a second terminal device meets a forwarding condition indicated by the forwarding condition information, determine to forward the information to be forwarded: and when the second terminal device does not meet the forwarding condition indicated by the forwarding condition information, forbid forwarding the information to be forwarded.

Optionally, the forwarding condition information includes at least one of position condition information or time condition information. The determination module 802 is specifically configured to determine whether to forward the information to be forwarded, according to at least one of: the position condition information and a position of the second terminal device, or the time condition information and a time at which the second terminal device receives the information to be forwarded.

Optionally, the position condition information includes at least one of: a longitude coordinate range of a terminal device required to forward the information to be forwarded, a latitude coordinate range of the terminal device required to forward the information to be forwarded, a height coordinate range of the terminal device required to forward the information to be forwarded, a minimum distance between the terminal device required to forward the information to be forwarded and a first terminal device, or a maximum distance between the terminal device required to forward the information to be forwarded and the first terminal device.

Optionally, the time condition information includes a moment at which the information to be forwarded is sent and a maximum time period during which the information to be forwarded needs to be forwarded. Or the time condition information includes a forwarding ending time for the information to be forwarded.

Optionally, the D2D device further includes the sending module 803. The information to be forwarded includes attribute information of the first terminal device and indication information. The determination module 802 is further configured to, when the second terminal device determines to forward the information to be forwarded, determine forwarding information according to the indication information, here, the forwarding information includes the information to be forwarded and attribute information of the second terminal device.

The sending module 803 is configured to forward the forwarding information.

Optionally, the attribute information includes position information and at least one of information: sending time information, type information of the terminal device or identity information of the terminal device.

Optionally, the sending module 803 is specifically configured to broadcast the forwarding information.

Figure 9:
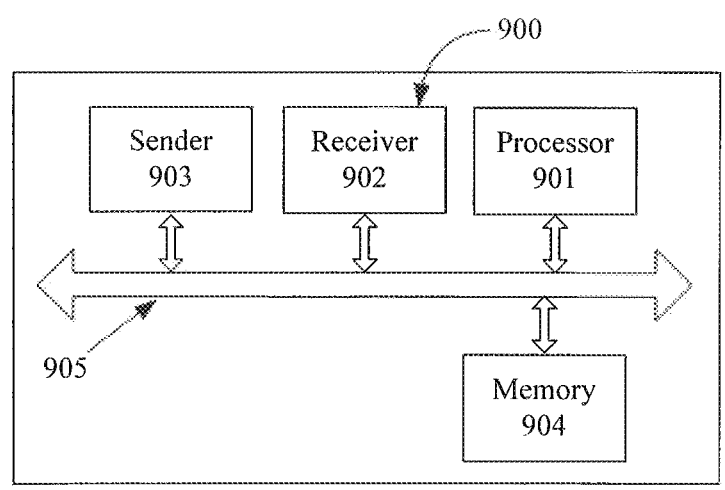
FIG. 9 is a structure block diagram of a D2D device according to another embodiment of the disclosure.

It is to be noted that in the embodiment of the disclosure, the determination module 802 may be implemented by a processor, the receiving module 801 may be implemented by a receiver and the sending module 803 may be implemented by a sender. As illustrated in FIG. 9, a D2D device 900 may include a processor 901, a receiver 902, a sender 903 and a memory 904. The memory 904 may be configured to store an instruction and may further be configured to store a code executed by the processor 901 and the like. Each component in the D2D device 900 is coupled together through a bus system 905. The bus system 905 includes a data bus, and further includes a power bus, a control bus and a state signal bus. The receiver 902 is specifically configured to receive information to be forwarded sent by a first terminal device, here, the information to be forwarded includes target information and forwarding condition information.

The processor 901 is configured to determine whether to forward the information to be forwarded, according to the forwarding condition information received by the receiver 902.

Optionally, the processor 901 is specifically configured to, when a second terminal device meets a forwarding condition indicated by the forwarding condition information, determine to forward the information to be forwarded; and when the second terminal device does not meet the forwarding condition indicated by the forwarding condition information, forbid forwarding the information to be forwarded.

Optionally, the forwarding condition information includes at least one of position condition information or time condition information. The processor 901 is specifically configured to determine whether to forward the information to be forwarded, according to at least one of: the position condition information and a position of the second terminal device, or the time condition information and a time at which the second terminal device receives the information to be forwarded.

Optionally, the position condition information includes at least one of: a longitude coordinate range of a terminal device required to forward the information to be forwarded, a latitude coordinate range of the terminal device required to forward the information to be forwarded, a height coordinate range of the terminal device required to forward the information to be forwarded, a minimum distance between the terminal device required to forward the information to be forwarded and a first terminal device or a maximum distance between the terminal device required to forward the information to be forwarded and the first terminal device.

Optionally, the time condition information includes a moment at which the information to be forwarded is sent and a maximum time period during which the information to be forwarded needs to be forwarded. Or the time condition information includes a forwarding ending time for the information to be forwarded.

Optionally, the information to be forwarded includes attribute information of the first terminal device and indication information. The processor 901 is further configured to, when the processor 901 determines to forward the information to be forwarded, determine forwarding information according to the indication information, here, the forwarding information includes the information to be forwarded and attribute information of the second terminal device.

The sender 903 is configured to forward the forwarding information.

Optionally, the attribute information includes position information and at least one of information: sending time information, type information of the terminal device or identity information of the terminal device.

Optionally, the sender 903 is specifically configured to broadcast the forwarding information.

Figure 10:
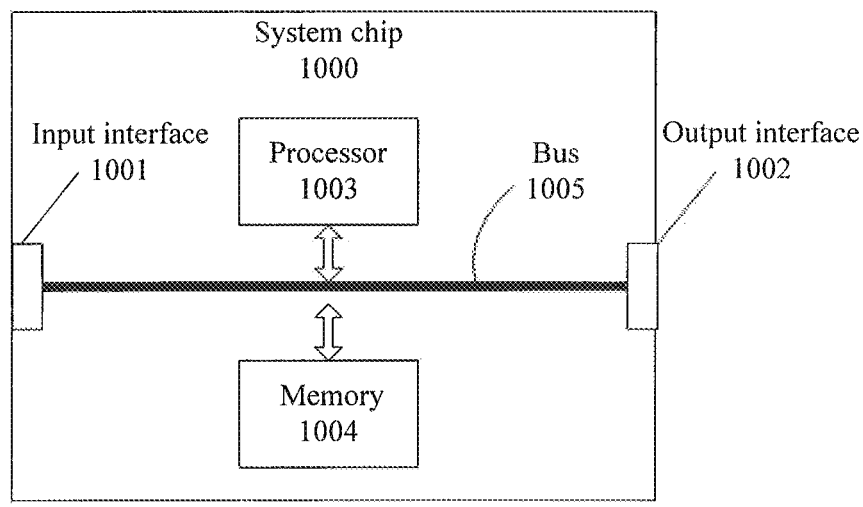
FIG. 10 is a schematic structure diagram of a system chip according to another embodiment of the disclosure.

FIG. 10 is a schematic structure diagram of a system chip according to an embodiment of the disclosure. The system chip 1000 of FIG. 10 includes an input interface 1001, an output interface 1002, at least one processor 1003 and a memory 1004. The input interface 1001, the output interface 1002, the processor 1003 and the memory 1004 are connected through a bus 1005. The processor 1003 is configured to execute a code in the memory 1004. When the code is executed, the processor 1003 may implement the method executed by a second terminal device in FIG. 2 or FIG. 3.

Figure 11:
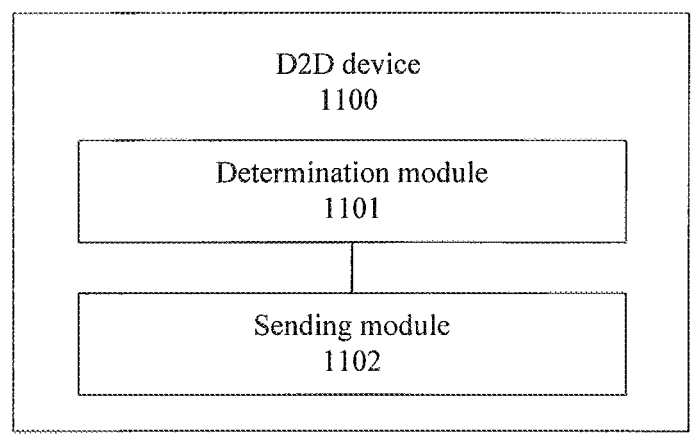
FIG. 11 is a structure block diagram of a D2D device according to another embodiment of the disclosure.

FIG. 11 is a schematic block diagram of a D2D device 1100 according to an embodiment of the disclosure. As illustrated in FIG. 11, the D2D device 1100 includes a determination module 1101 and a sending module 1102.

The determination module 1101 is configured to determine information to be forwarded, here, the information to be forwarded includes target information, attribute information of a first terminal device and indication information.

The sending module 1102 is configured to send the information to be forwarded determined by the determination module 1101. The indication information indicates that a second terminal device sends attribute information of the second terminal device along with the information to be forwarded.

Optionally, the attribute information includes position information and at least one of information: sending time information, type information of the terminal device or identity information of the terminal device.

Optionally, the sending module 1102 is specifically configured to send the information to be forwarded in a broadcast manner.

Figure 12:
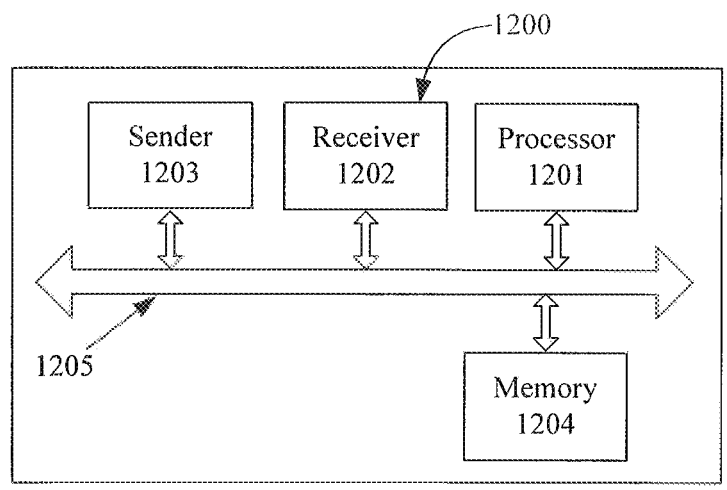
FIG. 12 is a structure block diagram of a D2D device according to another embodiment of the disclosure.

It is to be noted that in the embodiment of the disclosure, the determination module 1101 may be implemented by a processor and the sending module 502 may be implemented by a sender. As illustrated in FIG. 12, a D2D device 1200 may include a processor 1201, a receiver 1202, a sender 1203 and a memory 1204. The memory 1204 may be configured to store an instruction and may further be configured to store a code executed by the processor 1201 and the like. Each component in the D2D device 1200 is coupled together through a bus system 1205. The bus system 1205 includes a data bus, and further includes a power bus, a control bus and a state signal bus. The processor 1201 is specifically configured to determine information to be forwarded, here, the information to be forwarded includes target information, attribute information of a first terminal device and indication information.

The sender 1203 is configured to send the information to be forwarded determined by the processor 1201. The indication information indicates that a second terminal device sends attribute information of the second terminal device along with the information to be forwarded.

Optionally, the attribute information includes position information and at least one of information: sending time information, type information of the terminal device or identity information of the terminal device.

Optionally, the sender 1203 is specifically configured to send the information to be forwarded in a broadcast manner.

Figure 13:
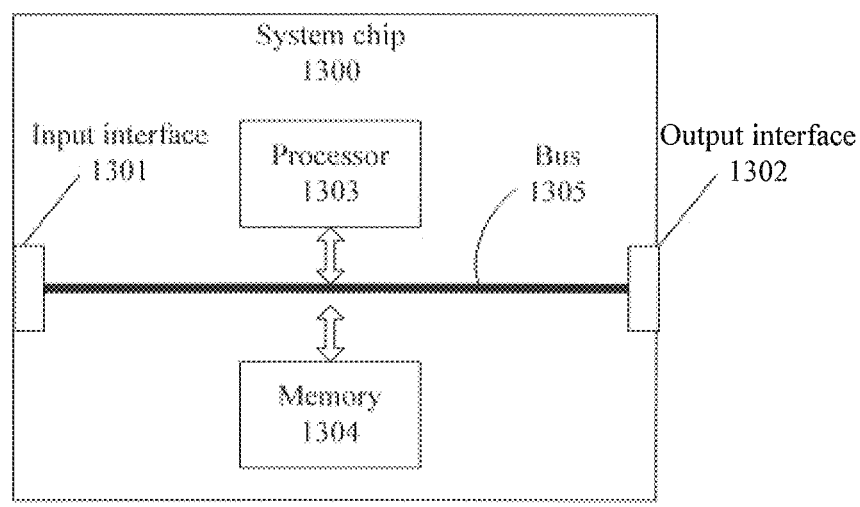
FIG. 13 is a schematic structure diagram of a system chip according to another embodiment of the disclosure.

FIG. 13 is a schematic structure diagram of a system chip according to an embodiment of the disclosure. The system chip 1300 of FIG. 13 includes an input interface 1301, an output interface 1302, at least one processor 1303 and a memory 1304. The input interface 1301, the output interface 1302, the processor 1303 and the memory 1304 are connected through a bus 1305. The processor 1303 is configured to execute a code in the memory 1304. When the code is executed, the processor 1303 implements the method executed by a first terminal device in FIG. 4.

Figure 14:
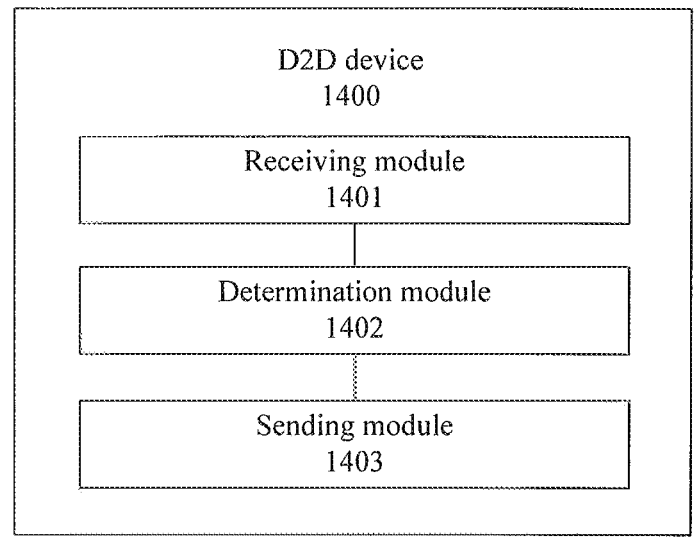
FIG. 14 is a structure block diagram of a D2D device according to another embodiment of the disclosure.

FIG. 14 is a schematic block diagram of a D2D device 1400 according to an embodiment of the disclosure. As illustrated in FIG. 14, the D2D device 1400 includes a receiving module 1401, a determination module 1402 and a sending module 1403.

The receiving module 1401 is configured to receive information to be forwarded sent by a first terminal device, here, the information to be forwarded includes target information, attribute information of the first terminal device and indication information.

The determination module 1402 is configured to determine forwarding information according, to the indication information received by the receiving module 1401, here, the forwarding information includes the information to be forwarded and attribute information of a second terminal device.

The sending module 1403 is configured to send the forwarding information determined by the determination module 1402.

Optionally, the attribute information includes position information and at least one of information: sending time information, type information of the terminal device or identity information of the terminal device.

Optionally, the determination module 1402 is further configured to, after the receiving module 1401 receives the information to be forwarded sent by the first terminal device, determine transmission paths for the information to be forwarded according to the information to be forwarded, here, the transmission paths include position information of terminal devices participating in forwarding of the information to be forwarded.

Optionally, the determination module 1402 is further configured to determine a target transmission path in multiple transmission paths for the information to be forwarded.

The sending module 1403 is further configured to send feedback information to the first terminal device according to the target transmission path.

Optionally, the determination module 1402 is further configured to determine a position distribution of multiple terminal devices participating in the forwarding of the information to be forwarded on the multiple transmission paths, according to the multiple transmission paths for the information to be forwarded.

Optionally, the sending module 1403 is specifically configured to send the forwarding information in a broadcast manner.

Figure 15:
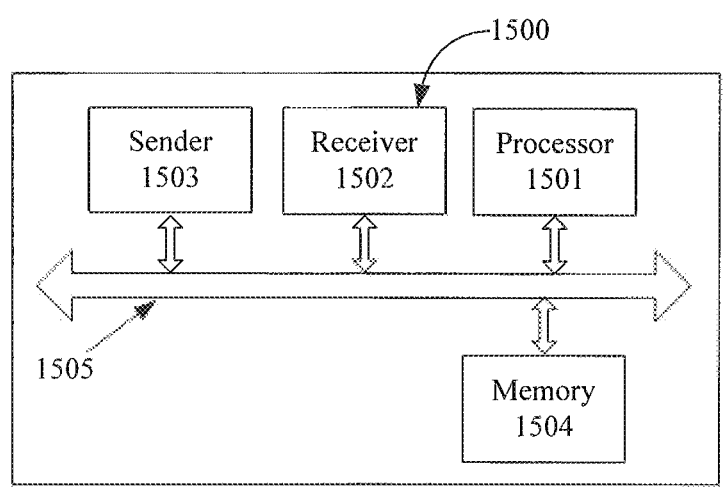
FIG. 15 is a structure block diagram of a D2D device according to another embodiment of the disclosure.

It is to be noted that in the embodiment of the disclosure, the determination module 1402 may be implemented by a processor, the receiving module 1401 may be implemented by a receiver and the sending module 1403 may be implemented by a sender. As illustrated in FIG. 15, a D2D device 1500 may include a processor 1501, a receiver 1502, a sender 1503 and a memory 1504. The memory 1504 may be configured to store an instruction and may further be configured to store a code executed by the processor 1501 and the like. Each component in the D2D device 1500 is coupled together through a bus system 1505. The bus system 1505 includes a data bus, and further includes a power bus, a control bus and a state signal bus. The receiver 1502 is specifically configured to receive information to be forwarded sent by a first terminal device, here, the information to be forwarded includes target information, attribute information of the first terminal device and indication information.

The processor 1501 is configured to determine forwarding information according to the indication information received by the receiver 1502. The forwarding information includes the information to be forwarded and attribute information of a second terminal device.

The sender 1503 is configured to send the forwarding information determined by the processor 1501.

Optionally, the attribute information includes position information and at least one of information: sending time information, type information of the terminal device or identity information of the terminal device.

Optionally, the processor 1501 is further configured to, after the receiver 1502 receives the information to be forwarded sent by the first terminal device, determine transmission paths for the information to be forwarded according to the information to be forwarded, here, the transmission paths include position information of terminal devices participating in forwarding of the information to be forwarded.

Optionally, the processor 1501 is further configured to determine a target transmission path in multiple transmission paths for the information to be forwarded.

The sender 1503 is further configured to send feedback information to the first terminal device according to the target transmission path.

Optionally, the processor 1501 is further configured to determine a position distribution of multiple terminal devices participating in the forwarding of the information to be forwarded on the multiple transmission paths, according to the multiple transmission paths for the information to be forwarded.

Optionally, the sender 1503 is specifically configured to send the forwarding information in a broadcast manner.

Figure 16:
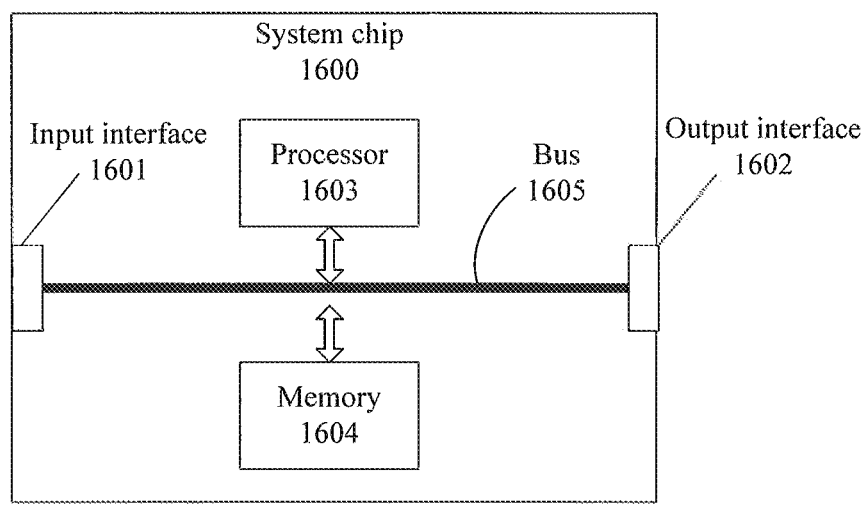
FIG. 16 is a schematic structure diagram of a system chip according to another embodiment of the disclosure.

FIG. 16 is a schematic structure diagram of a system chip according to an embodiment of the disclosure. The system chip 1600 of FIG. 16 includes an input interface 1601, an output interface 1602, at least one processor 1603 and a memory 1604. The input interface 1601, the output interface 1602, the processor 1603 and the memory 1604 are connected through a bus 1605. The processor 1603 is configured to execute a code in the memory 1604. When the code is executed, the processor 1603 implements the method executed by a second terminal device in FIG. 4.

It is to be understood that the processor in the embodiment of the disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in the field, such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an EPROM, an EEPROM or a flash memory. The volatile memory may be a RAM, and is used as an external high-speed cache. It is exemplarily but unlimitedly described that RAMS in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, these memories and any other proper types of memories.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, the illustrated or discussed coupling or direct coupling or communication connection with each other may be indirect coupling or communication connection through some interfaces, devices or units, and may be may be electrical, mechanical or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes various media capable of storing program codes, such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for Device to Device (D2D) communication, comprising:
   determining, by a first terminal device, information to be forwarded, the information to be forwarded comprising: target information, forwarding condition information, attribute information of the first terminal device and indication information, wherein
      the forwarding condition information comprises at least one of position condition information or time condition information,
      the attribute information of the first terminal device comprises position information of the first terminal device and at least one of: type information of the first terminal device or identity information of the first terminal device, and
      the indication information indicates that a second terminal device receiving the information to be forwarded sends, when it is determined to forward the information to be forwarded, attribute information of the second terminal device along with the information to be forwarded, wherein the attribute information of the second terminal device comprises position information of the second terminal device and at least one of: type information of the second terminal device or identity information of the second terminal device; and
   broadcasting by the first terminal device, the information to be forwarded, so that the second terminal device receiving the information to be forwarded determines, according to the forwarding condition information, whether to forward the information to be forwarded.

2. The method of claim 1, wherein the position condition information comprises at least one of:
   a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and the first terminal device, or a maximum distance between a terminal device required to forward the information to be forwarded and the first terminal device.

3. The method of claim 1, wherein the time condition information comprises a moment at which the information to be forwarded is sent and a maximum time period during which the information to be forwarded needs to be forwarded, or the time condition information comprises a forwarding ending time for the information to be forwarded.

4. The method of claim 1, wherein the attribute information of the first terminal device further comprises sending time information of the first terminal device and the attribute information of the second terminal device further comprises sending time information of the second terminal device.

5. The method of claim 1, wherein the first terminal device is a vehicle-mounted device, and the target information comprises user requirement information of the first terminal device or present traffic condition information.

6. A method for Device to Device (D2D) communication, comprising:
   receiving, by a second terminal device, information to be forwarded sent by a first terminal device, the information to be forwarded comprising: target information, forwarding condition information, attribute information of the first terminal device and indication information, wherein
      the forwarding condition information comprises at least one of position condition information or time condition information,
      the attribute information of the first terminal device comprises position information of the first terminal device and at least one of: type information of the first terminal device or identity information of the first terminal device, and
      the indication information indicates that the second terminal device receiving the information to be forwarded sends, when it is determined to forward the information to be forwarded, attribute information of the second terminal device along with the information to be forwarded, wherein the attribute information of the second terminal device comprises position information of the second terminal device and at least one of: type information of the second terminal device or identity information of the second terminal device; and determining, by the second terminal device according to the forwarding condition information, whether to forward the information to be forwarded.

7. The method of claim 6, wherein determining, by the second terminal device according to the forwarding condition information, whether to forward the information to be forwarded comprises:

when the second terminal device meets a forwarding condition indicated by the forwarding condition information, determining to forward the information to be forwarded; and when the second terminal device does not meet the forwarding condition indicated by the forwarding condition information, forbidding forwarding the information to be forwarded.

8. The method of claim 6, wherein determining, by the second terminal device according to the forwarding condition information, whether to forward the information to be forwarded comprises:

determining, by the second terminal device, whether to forward the information to be forwarded, according to at least one of:

the position condition information and a position of the second terminal device, or the time condition information and a time at which the second terminal device receives the information to be forwarded.

9. A Device to Device (D2D) device, comprising:

a processor and a storage storing an instruction that when executed by the processor, cause the processor to determine information to be forwarded, the information to be forwarded comprising: target information, forwarding condition information, attribute information of the first terminal device and indication information, wherein the forwarding condition information comprises at least one of position condition information or time condition information, the attribute information of the first terminal device comprises position information of the first terminal device and at least one of: type information of the first terminal device or identity information of the first terminal device, and the indication information indicates that a second terminal device receiving the information to be forwarded sends, when it is determined to forward the information to be forwarded, attribute information of the second terminal device along with the information to be forwarded, wherein the attribute information of the second terminal device comprises position information of the second terminal device and at least one of: type information of the second terminal device or identity information of the second terminal device; and a sender, configured to broadcast the information to be forwarded, so that the second terminal device receiving the information to be forwarded determines, according to the forwarding condition information, whether to forward the information to be forwarded.

10. The D2D device of claim 9, wherein the position condition information comprises at least one of:

a longitude coordinate range of a terminal device required to forward the information to be forwarded, a latitude coordinate range of a terminal device required to forward the information to be forwarded, a height coordinate range of a terminal device required to forward the information to be forwarded, a minimum distance between a terminal device required to forward the information to be forwarded and a first terminal device, or a maximum distance between a terminal device required to forward the information to be forwarded and the first terminal device.

11. The D2D device of claim 9, wherein the time condition information comprises a moment at which the information to be forwarded is sent and a maximum time period during which the information to be forwarded needs to be forwarded, or the time condition information comprises a forwarding ending time for the information to be forwarded.

12. The D2D device of claim 9, wherein the attribute information of the first terminal device further comprises sending time information of the first terminal device and the attribute information of the second terminal device further comprises sending time information of the second terminal device.

13. The D2D device of claim 9, wherein the first terminal device is a vehicle-mounted device, and the target information comprises user requirement information of the first terminal device or present traffic condition information.

* * * * *